United States Patent [19]

Naimpally et al.

[11] Patent Number: 5,294,974
[45] Date of Patent: Mar. 15, 1994

[54] HIGH-DEFINITION VIDEO ENCODING SYSTEM HAVING COLOR-SENSITIVE QUANTIZATION

[75] Inventors: Saiprasad V. Naimpally, Langhorne; Siu-Leong Iu, Bensalem, both of Pa.; Hee-Yong Kim, Plainsboro, N.J.

[73] Assignee: Matsushita Electric Corporation of America, Secaucus, N.J.

[21] Appl. No.: 920,184

[22] Filed: Jul. 24, 1992

[51] Int. Cl.$^5$ .................... H04N 7/133; H04N 11/04
[52] U.S. Cl. .................... 348/395; 348/405; 348/419
[58] Field of Search .................... 358/13, 13 C, 27, 28, 358/29, 133, 10; H04N 7/133, 11/04

[56] References Cited

U.S. PATENT DOCUMENTS

| | | | |
|---|---|---|---|
| 4,926,246 | 5/1990 | Darling | 358/13 |
| 4,999,705 | 3/1991 | Puri | 358/136 |
| 5,079,621 | 1/1992 | Daly | 358/13 |
| 5,130,786 | 7/1992 | Murata | 358/13 |
| 5,134,475 | 7/1992 | Johnston | 358/133 |
| 5,157,488 | 10/1992 | Pennebaker | 358/133 |

OTHER PUBLICATIONS

M. Kiver & M. Kaufman, "Television Electronics-Theory & Servicing, Eighth Edition," Sec. 8.4 (pp. 189-190), 1983.

*Primary Examiner*—Howard W. Britton
*Attorney, Agent, or Firm*—Ratner & Prestia

[57] ABSTRACT

A video signal encoder uses an encoding system such as that developed by the Moving Picture Experts Group (MPEG). A key component of this encoding system increases the quantization step size of image data, thus decreasing its quantization resolution, to reduce the number of bits used to encode the data. Apparatus according to the present invention, monitors the color information being encoded and inhibits or reduces any increase in quantization step size for the luminance component and the color component of the image when signals representing saturated or nearly saturated red image components are being encoded.

11 Claims, 5 Drawing Sheets

HIGH-DEFINITION VIDEO ENCODING SYSTEM HAVING COLOR-SENSITIVE QUANTIZATION

The present invention is embodied in a high definition video encoding system which reduces quantization distortion in areas of a video image to which human vision is sensitive and, specifically, in a system which selectively increases quantization resolution of encoded data in areas of the image containing colors which are close to being saturated and which have a range of hues that includes red.

BACKGROUND OF THE INVENTION

Significant reduction in video bandwidth for storage and transmission purposes is desirable in various applications such as compact disc video and high-definition television. One type of video compression system which has received considerable attention lately is that proposed by the Moving Pictures Expert Group (MPEG), a committee within the International Standards Organization (ISO). The MPEG system is described in a paper entitled, "MPEG Video Simulation Model 3 (*SM3*)" by the Simulation Model Editorial Group, available from ISO as ISO-IEC/JTC1/SC2/WG11/N0010 MPEG 90/041, 1990 which is hereby incorporated by reference for its teachings on the MPEG video signal encoding method. This system is related to the conditional Motion Compensated Interpolation (CMCI) video encoding system described in U.S. Pat. No. 4,999,705 entitled THREE DIMENSIONAL MOTION COMPENSATED VIDEO CODING, which is hereby incorporated by reference for its teachings on video encoding techniques.

The MPEG system integrates a number of well-known data compression techniques into a single system. These include motion-compensated predictive coding, discrete cosine transformation (DCT), adaptive quantization and variable-length coding (VLC). In these systems, the adaptive quantization step is performed on the coefficient values produced by the discrete cosine transform operation for blocks of 64 pixels derived from the input image.

The DCT coefficients are quantized with varying resolution as a function of the amount of data generated by the encoding operation. If an individual image frame produces a relatively large amount of encoded data, the quantization step sizes applied to successive frames may need to be increased to reduce the amount of encoded data used to represent those frames, so that the average level of data produced over several frame intervals is able to be transmitted through a fixed-bandwidth channel.

If, when the quantizer is applying coarse quantization to the DCT coefficients, an image is encoded which includes an object having relatively few contours, the reproduced image of this object may have undesirable quantization distortion. This distortion would appear as an exaggeration of the contours in the object. In addition, if the object contains color areas which are saturated or close to being saturated, the quantization distortion in the reproduced image may cause undesirably large steps in saturation, causing the object to appear cartoon-like. This is especially true if these saturated or close-to-saturated colors are in the range of red to orange, since the human eye is more sensitive to detail in this color range than in other color ranges.

It is well known that the human eye is most sensitive to detail in color hues defined by the in-phase or I chrominance vector, as defined by the National Television Standards Committee (NTSC). In actual images, however, quantization distortion is more likely to be noticed in red objects than in objects having hues defined by the I chrominance vector, since in actual images, red objects will be more prevalent, have more highly saturated colors and have fewer contours than objects having reddish-orange hues defined by the I chrominance vector. Although I hues, such as flesh tones, are prevalent in many video images, they are generally present only at relatively low levels of saturation.

SUMMARY OF THE INVENTION

The present invention is embodied in a video encoding system which includes apparatus that assigns a variable quantization step-size to the data. Circuitry in the encoder detects pixels representing objects having colors within a predefined range and adjusts the applied quantization step-size in a manner that mitigates any quantization distortion that may appear in the reproduced image of the object.

According to the one aspect of the invention, the selected range of colors is centered about red.

According to another aspect of the invention, the selected range of colors is centered about the I color vector in a conventional chrominance phase chart.

DETAILED DESCRIPTION OF THE EXEMPLARY EMBODIMENTS

Although this invention is described in terms of an MPEG video encoding system, it is contemplated that it may be used with other types of encoding in which pixels representing color images are encoded, at least in part, by changing their quantization step-size.

Figure 1:
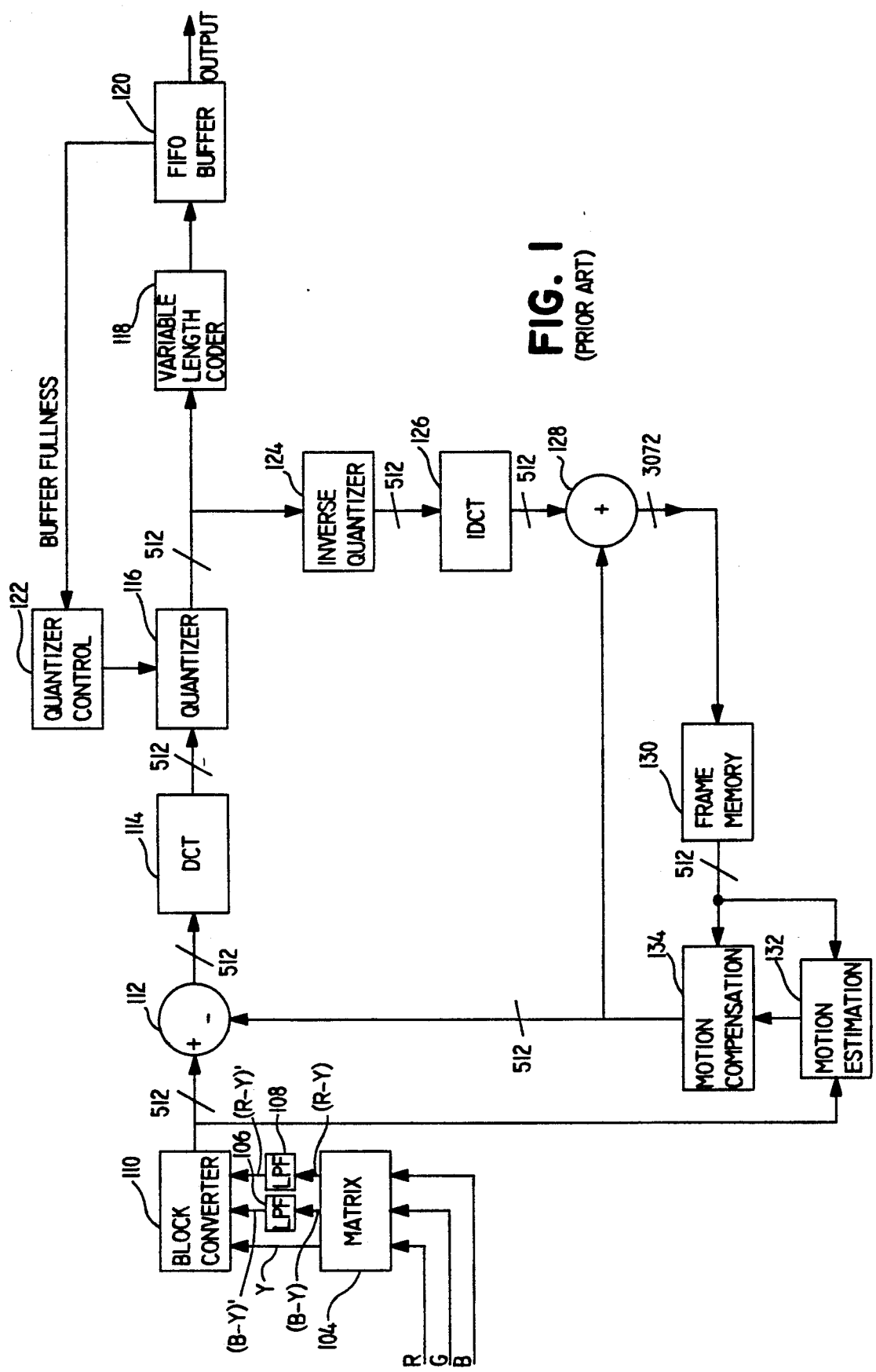
FIG. 1 (Prior Art) is a block diagram of an exemplary video signal encoding system.

An exemplary prior art MPEG encoding system is shown in FIG. 1. In this system, red (R), green (G) and blue (B) color signals which describe an image are provided in raster scan order from a video camera (not shown) or other video source. These signals are processed by a conventional color matrix circuit 104 to generate a luminance signal (Y) and two color-difference signals ((B-Y) and (R-Y)). The color-difference signals (B-Y) and (R-Y) are processed by respective low-pass filters 106 and 108. The exemplary filters 106 and 108 spatially filter the respective color-difference signals to produce signals having one-half of the spatial resolution of the luminance signal in each of the horizontal and vertical directions.

The luminance signal, Y, and the two spatially-filtered color-difference signals, (B-Y)' and (R-Y)', are applied to a block converter 110. The converter 110 which may include, for example, a conventional dual-port memory, converts the signals Y, (B-Y)' and (R-Y)' from raster scan format to a block format.

Figure 3:
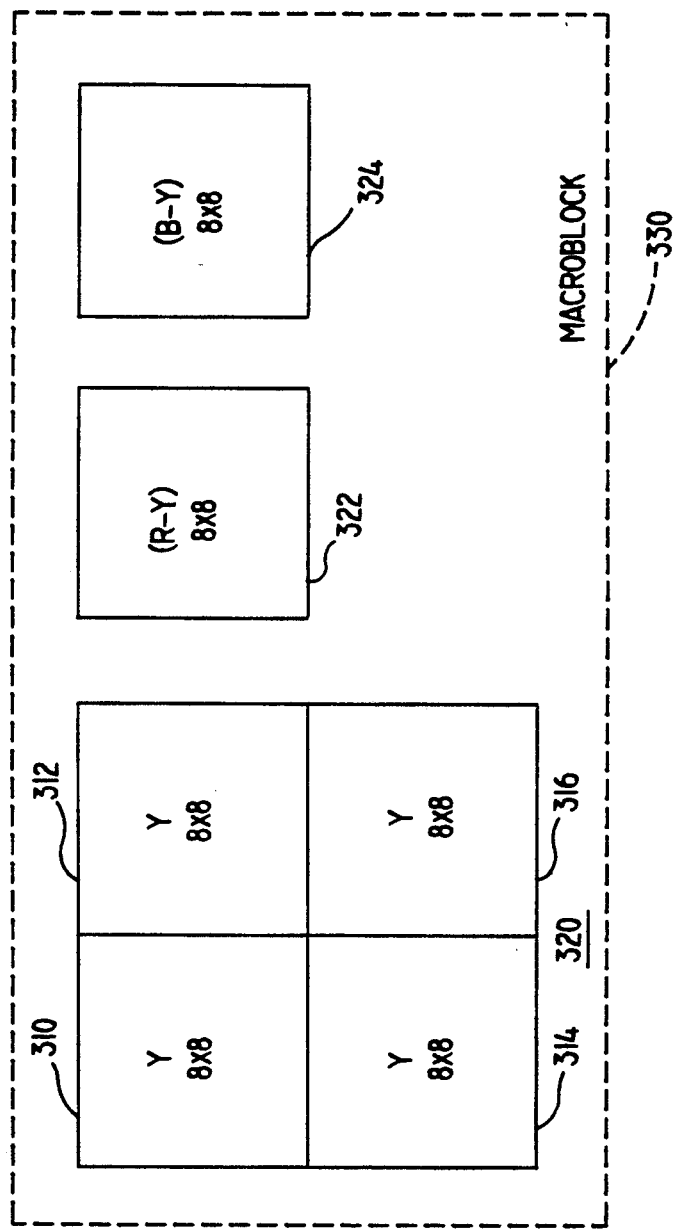
FIG. 3 (Prior Art) is a diagram which illustrates the structure of a macroblock.

In the block format, each frame of the image is represented as a collection of blocks where each block has sixty-four pixels arranged as a matrix of eight horizontal pixels by eight vertical pixels. The block converter 110 combines several contiguous pixel blocks into a data structure known as a macroblock. FIG. 3 shows an exemplary macroblock data structure 330 which contains four 64 pixel luminance blocks, 310, 312, 314 and 316; one 64 pixel block of the (B-Y)' color difference signal 322; and one 64 pixel block of the (R-Y)' color-difference signal 324. Each of these pixel values is represented as an eight-bit digital value. The block converter 110 provides these pixel values one block at a time to a subtracter 112.

Figure 4A:
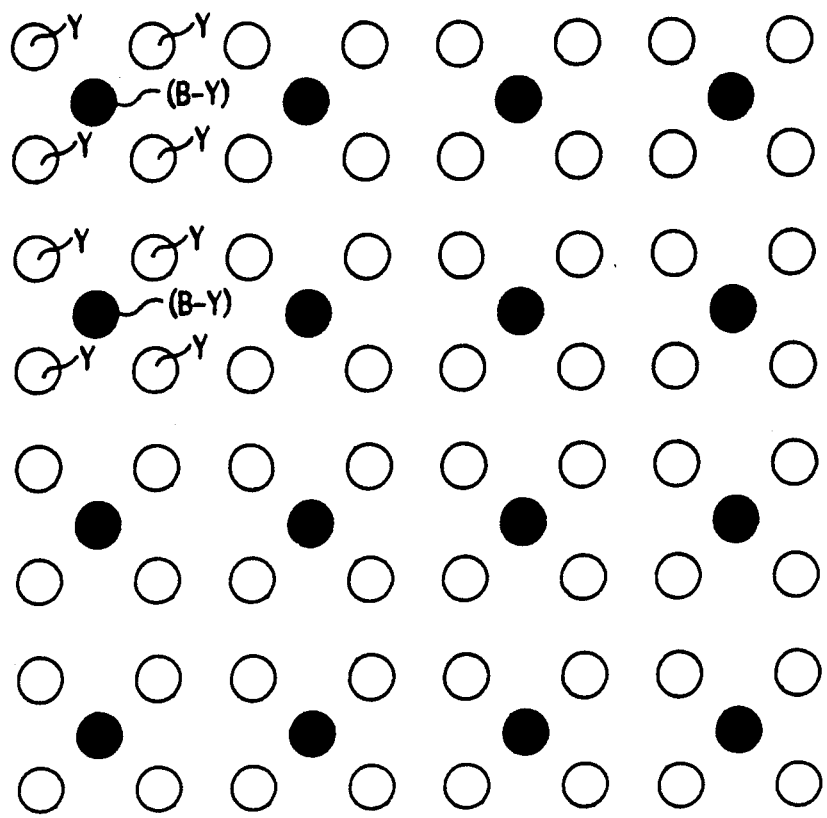
FIG. 4A (Prior Art) is a pixel diagram which illustrates the spatial relationship between luminance and color-difference signal pixels.
Figure 4B:
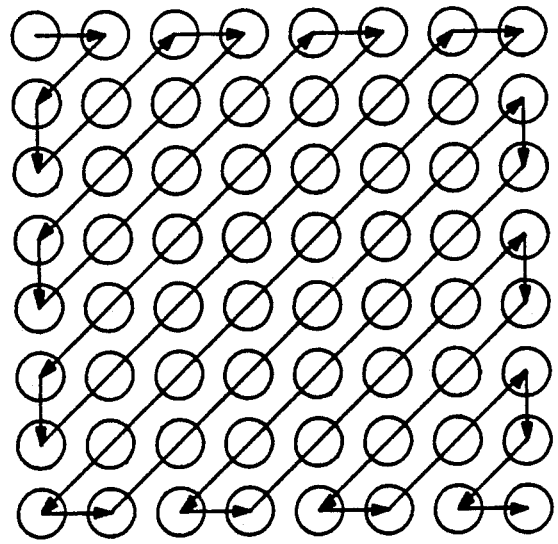
FIG. 4B (Prior Art) is a pixel diagram which illustrates the zigzag scan structure used by the encoders shown in FIGS. 1 and 2.

The subtracter 112 subtracts each block of a macroblock provided by motion compensation circuitry 134 from a corresponding block of a macroblock provided by the block converter 110. The subtracter 112 generates blocks of data representing a motion-predicted differentially-coded macroblock. These generated blocks are applied to a discrete cosine transform (DCT) processor 114. The DCT processor 114 applies a discrete cosine transformation to each of the six blocks of differential pixel values to convert them into six corresponding blocks of DCT coefficients. Each of these blocks is then rearranged into a linear stream of 64 coefficients using a zigzag scan such as that shown in FIG. 4B.

For any block, the first of these coefficients represents the direct current (DC) spatial-frequency component of the pixels in the block and the remaining coefficients represent components at successively higher spatial frequencies.

The coefficient values provided by the DCT processor 114 are applied to a quantizer 116 which translates each coefficient value into a binary value having an assigned number of bits. In general, a larger number of bits is used for the lower-order coefficients than for the higher-order coefficients since the human eye is less sensitive to image components at higher spatial frequencies than to components at lower spatial frequencies. This operation may be performed, for example, by dividing each coefficient value in the linearized block by a respectively different value, which is proportional to the frequency of the coefficient. An array containing these values may be transmitted with the signal to allow the signal to be dequantized at its destination.

In addition, the number of bits assigned to each coefficient value may be changed in response to values provided by quantizer control circuitry 122, described below. These values may be applied, one per macroblock, to divide each coefficient values in the macroblock by the value before or after they are divided by the array of frequency-dependent values. The quantizer 116 produces a stream of digital values which are applied to a variable-length coder 118 and to an inverse quantizer 124.

The variable-length coder 118 encodes the data using, for example, an amplitude run-length Huffman-type code. The signals produced by the variable-length coder 118 are applied to a first-in-first-out (FIFO) buffer 120 which stores the values for transmission at a predetermined rate as the signal output.

As described above, the output signal produced by the quantizer 116 is also applied to an inverse quantizer 124. The inverse quantizer 124 reverses the operation performed by the quantizer 116 to produce approximate discrete cosine transform coefficients representing each block of the encoded image. These coefficient values are applied to an inverse discrete cosine transform (IDCT) processor 126. This processor reverses the discrete cosine transform operation to produce values representing the differentially-coded motion-predicted values provided by the subtracter 112.

These values are applied by the IDCT circuitry 126 to one input port of an adder 128. The other input port of the adder 128 is coupled to receive the motion-compensated values from the previous frame which were used in the subtracter 112 to generate the differentially-encoded motion-predicted values. Adder 128 sums these values to produce decoded pixel values which are stored in the frame memory 130.

Motion-estimation circuitry 132 is coupled to receive both the blocks of pixels produced by the block converter 110 and the decoded blocks of pixels as stored in frame memory 130. Circuitry 132 compares each macroblock provided by the block converter 110, block by block, to corresponding blocks of surrounding macroblocks from a previously encoded frame. The macroblock from the previous frame which exhibits the smallest difference with respect to the input macroblock, according to some mathematical function of the two blocks, is identified as the best matching macroblock.

When the best matching macroblock has been located, it is provided by the motion-compensation circuitry 134 to the subtracter 112 to generate the differentially-encoded motion-compensated pixel values. After these values have been encoded and decoded, this macroblock is also provided to the adder 128 to generate the decoded macroblock.

Different types of images produce encoded frames having differing numbers of bits. For example, a video image of a large monochrome object such as a close-up of a single flower may need only a small number of bits in the encoded data while a scene of garden full of flowers may need a relatively large number of bits.

The FIFO-buffer 120 compensates for the varying rates at which encoded information is generated by controlling the quantization step-size applied by the quantizer 116. In an exemplary embodiment of the invention, the FIFO-buffer 120 has one low-water mark and three high-water marks which define differing amounts of stored data. The low-water mark may, for example, indicate that the FIFO buffer 120 is fifty percent full; the first high-water mark, that it is seventy-five percent full; the second high-water mark, that it is ninety percent full; and the last high-water mark, that it is ninety-five percent full.

In response to the various buffer-fullness signals, the quantizer-control circuitry 122 conditions the quantizer 116 to apply different levels of quantization resolution to the coefficient values provided by the DCT 114. In response to the low-water mark buffer-fullness signal, the quantizer-control circuitry 122 would condition the quantizer 116 to apply a relatively fine level of quantization resolution to the coefficient values. In response to each of the high-water mark signals, the control circuitry 122 would cause the quantizer 116 to apply successively coarser levels of quantization resolution to the coefficient values. Once any of the coarse quantization levels have been applied, the fine quantization level will only be applied after the next low-water mark buffer-fullness signal has been received from the FIFO-buffer 120.

Thus, as the FIFO-buffer 120 holds successively more data, the quantizer 116 produces fewer bits of encoded data by more coarsely-quantizing the DCT coefficients representing the received image. If, when the quantizer is applying coarse quantization to the DCT coefficients, an image is encoded which includes an object having relatively few contours, the reproduced image of this object may have undesirable quantization distortion. In addition, if the object contains color areas in the red to orange range which are saturated or close to being saturated, the quantization distortion in the reproduced image may cause undesirably large steps in saturation, causing the contours to either disappear or to appear exaggerated in the reproduced image.

The number of high water marks, low water marks and quantization adjustment values used in this description are exemplary. In an actual implementation, a larger number of each of these values may be desirable.

Figure 2:
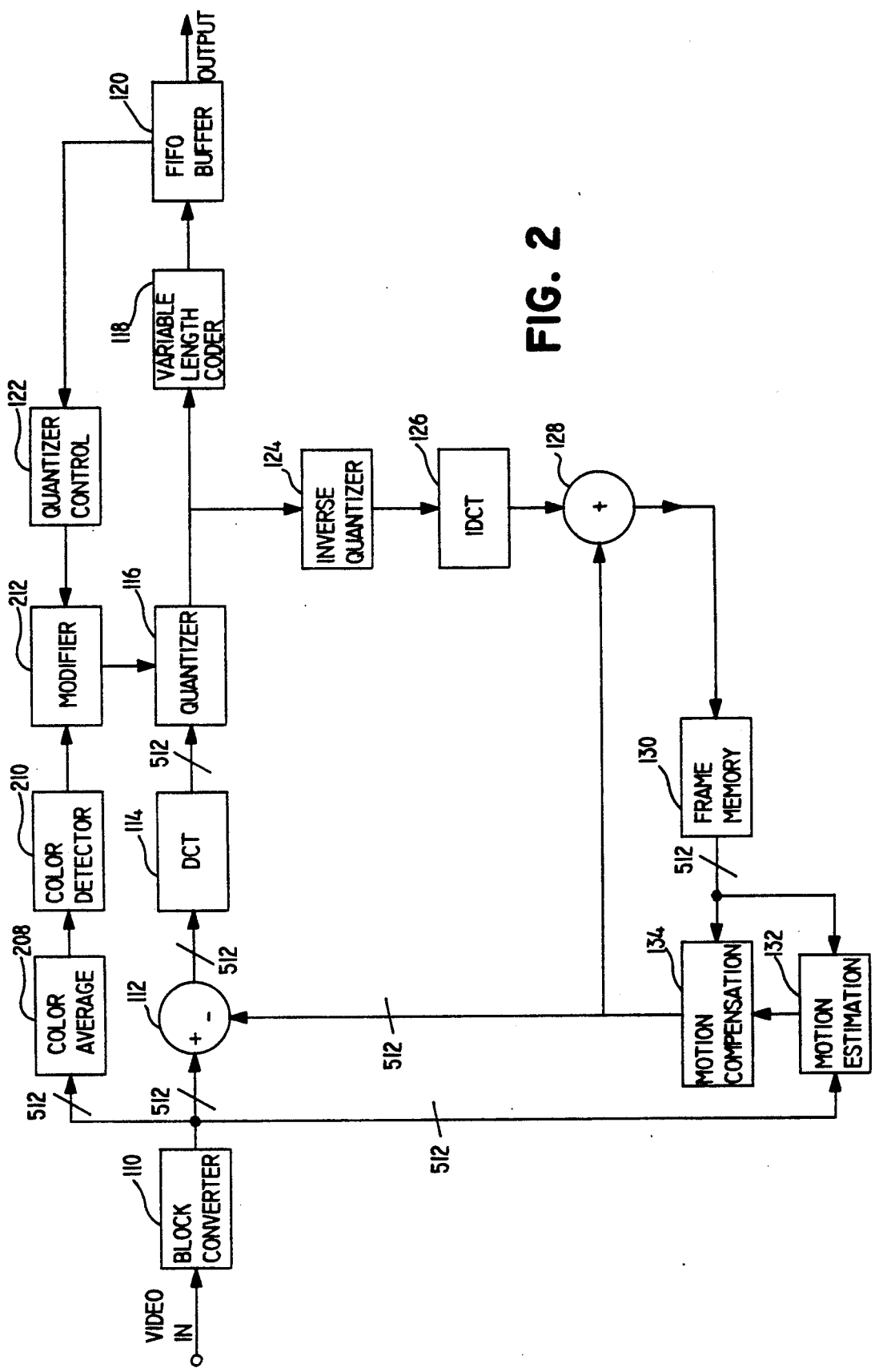
FIG. 2 is a block diagram of the encoding system shown in FIG. 1 modified to include an embodiment of the present invention.

FIG. 2 is a block diagram of a video encoding system according to the MPEG standard which includes an embodiment of the present invention. The encoding system shown in FIG. 2 differs from that shown in FIG. 1 by the addition of a color average circuit 208, a color detector circuit 210 and a quantization modifier 212.

Briefly, the color average circuit 208 generates average values for each block of color difference pixels in each macroblock, the color detector circuitry 210 locates blocks of pixel values representing the (B-Y) and (R-Y) color-difference signals that represent saturated or nearly-saturated colors in a range which includes red. The color detector 210 conditions the modifier 212 to change the quantization step-size provided by the quantizer-control circuitry 122 in order to quantize the identified blocks of (B-Y) and (R-Y) color-difference signals using finer quantization steps than would normally be used. The inventors have found that this modification of the MPEG video encoding system significantly reduces quantization artifacts in saturated or nearly-saturated red and orange objects.

The exemplary color-average circuitry 208 receives a 512-bit signal from the block converter 110. This signal represents sixty-four pixels of one of the (B-Y) and (R-Y) color-difference signal blocks in the current macroblock. The two color difference signal blocks are processed sequentially by the color average circuitry 208 with the average value generated from the first block being stored until the second block is processed.

The color-average circuitry 208 averages the sixty-four pixel values in each of the blocks of (B-Y) and (R-Y) pixels that make up a macroblock. The two average values are then applied to the color detector 210.

Figure 6:
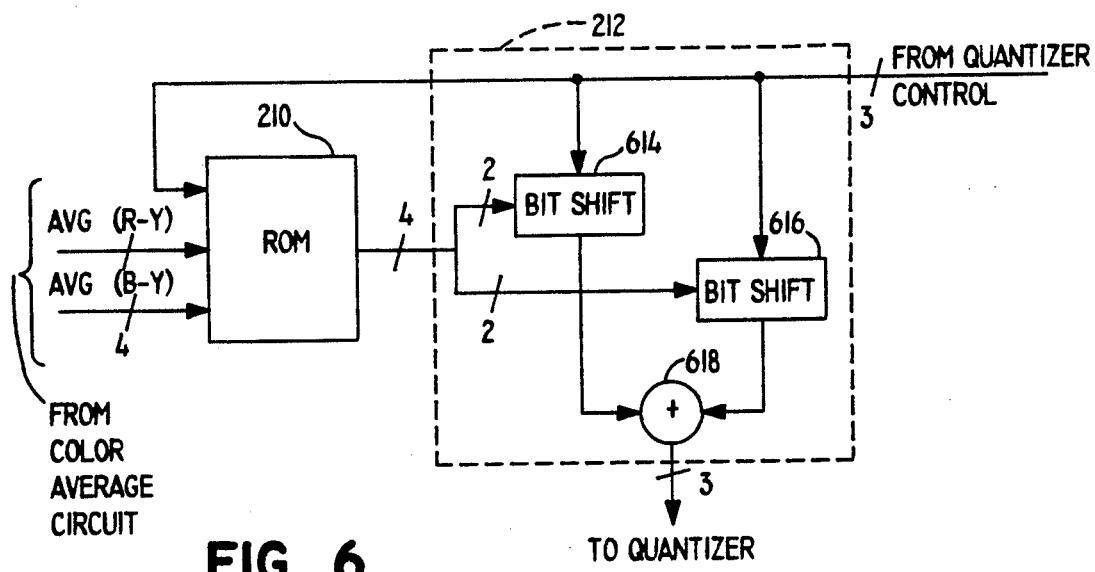
FIG. 6 is a block diagram of exemplary color detection circuitry and quantization modifier circuitry suitable for use in the embodiment of the invention shown in FIG. 2.

As shown in FIG. 6, the exemplary color detector 210 includes a read-only memory (ROM) which receives, as an address input value, a combination of: the average (B-Y) value, the average (R-Y) value and the current quantization value from the quantization control circuitry 122. The digital value stored in the ROM cell which is addressed by this address value is provided as a control value to the quantization modifier 212.

As shown in FIG. 6, the exemplary quantization modifier includes a simple shift-and-add multiplier comprising two bit-shift circuits 614 and 616 and an adder 618. Each of the bit-shifters 614 and 616 may be conditioned by a two-bit control signal to pass a zero-valued signal, the unshifted input signal or the input signal shifted to less significant bit positions by one bit or by two bits. Although shown as a shift and add multiplier, it is contemplated that the modifier may be implemented as another type of digital multiplier or eliminated entirely, whereby the modified quantization levels would be provided directly by the ROM 210.

During normal operation, when the current block is not detected as being saturated red or nearly red, the bit-shifter 614 is conditioned to pass a zero-valued signal while the bit-shifter 616 is conditioned to pass an unshifted signal. In this instance, the output of the modifier circuitry 212 is the same as the input value received from the quantizer-control circuitry 122. When, however, a block of pixels which is to be modified is detected by the color detection circuitry 210, the bit-shift circuits 614 and 616 and the adder 618 effectively multiply the value provided by the quantizer circuitry 122 by factors ranging from one-quarter to two in steps of one-quarter.

In the exemplary embodiments of the invention, the quantization factors are modified to increase the quantization resolution of the four Y blocks and the (B-Y) and (R-Y) blocks of any macroblock which is detected as representing a red or near-red color which is saturated or nearly saturated. Alternatively, the quantization factors may be modified only for the (B-Y) and (R-Y) blocks of a detected macroblock.

It is contemplated that the same techniques may be applied to increase the quantization resolution of macroblocks representing other colors to which the human eye is sensitive, to decrease the quantization resolution of macroblocks blocks representing colors to which the human eye is less sensitive, or to provide a stepwise continuous range of quantization modification values as a function of color hue and saturation.

Figure 5:
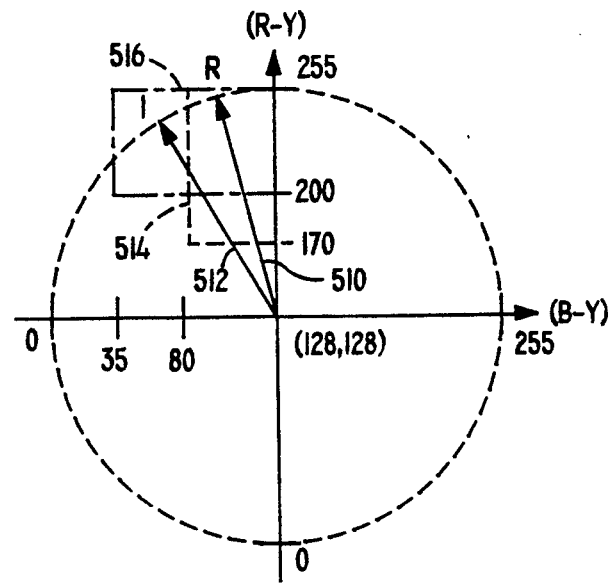
FIG. 5 is a color-phase diagram which illustrates a range of pixel values affected by the quantization modification circuitry shown in FIG. 2.

FIG. 5 is a conventional color-phase diagram which illustrates how the color detector 210 may be programmed to control the bit-shifters 614 and 616. In the phaser diagram shown in FIG. 5, the color plane is represented by two axes corresponding to the two color-difference signals, (B-Y) and (R-Y), used in this embodiment of the invention. Each of these color-difference signals may range in value from 0 to 255 (i.e. the values which may be represented by an eight-bit binary number). The origin of the coordinate system used for this phaser diagram, thus, occurs at a point halfway along each of the (B-Y) and (R-Y) coordinate axes, that is to say at the point (128, 128).

Both the red (R) 510 and in-phase (I) 512 chrominance signal vectors are shown in FIG. 5. The dashed-line rectangle 514 represents a range of values which may be detected by the color detector 210 in order to control the quantization modifier circuitry 212 to provide quantization improvement for red or near-red objects in the image. This range covers values of the (B-Y) color-difference between 80 and 128 and of the (R-Y) color-difference signal between values of 170 and 255. Alternatively, the values recognized by the color detector may include the colors corresponding to the I color-difference signal, to which the human eye is most sensitive.

An exemplary range of values which corrects for quantization distortion for objects having hues represented by both the R and I chrominance vectors, is shown as the dashed-line rectangle 516. These may be values between 35 and 128 along the (B-Y) axis and between 200 and 255 along the (R-Y) axis.

In these rectangular areas, the quantization step-size may be successively reduced as colors closer to either the R vector or the I vector are approached and as the colors become more completely saturated.

As described above, a typical quantizer 116 operates by dividing the various frequency coefficient values, produced by the DCT processor 114, by respectively different values, in proportion to their respective frequencies. In addition, each coefficient value is divided by the value provided by the quantizer control circuitry 122. When the coefficients are divided by relatively large values they are coarsely quantized and when they are divided by relatively small values they are finely quantized.

Three exemplary programs for the ROM 210 which control quantization of values surrounding the red color-difference signal are shown in the tables below.

TABLE 1

| AVG (B-Y) | AVG (R-Y) | Quantization divider | | | | | | |
|---|---|---|---|---|---|---|---|---|
| | | 1 | 2 | 3 | 4 | 5 | 6 | 7 |
| <80 | <170 | 1,0 | 1,0 | 1,0 | 1,0 | 1,0 | 1,0 | 1,0 |
| >80 | <170 | 1,0 | 1,0 | 1,0 | 1,0 | 1,0 | 1,0 | 1,0 |
| <80 | >170 | 1,0 | 1,0 | 1,0 | 1,0 | 1,0 | 1,0 | 1,0 |
| >80 | >170 | 1,0 | ½,0 | ½,0 | ½,0 | ½,0 | ½,0 | ½,0 |

TABLE 2

| AVG (B-Y) | AVG (R-Y) | Quantiztion divider | | | | | | |
|---|---|---|---|---|---|---|---|---|
| | | 1 | 2 | 3 | 4 | 5 | 6 | 7 |
| (B-Y)<80 | (R-Y)<170 | 1,0 | 1,0 | 1,0 | 1,0 | 1,0 | 1,0 | 1,0 |
| (B-Y)>80 | (R-Y)<170 | 1,0 | 1,0 | 1,0 | 1,0 | 1,0 | 1,0 | 1,0 |
| (B-Y)<80 | (R-Y)>170 | 1,0 | 1,0 | 1,0 | 1,0 | 1,0 | 1,0 | 1,0 |
| 80<(B-Y)<100 | 170<(R-Y)<220 | 1,0 | 1,0 | 1,0 | 1,½ | 1,½ | ½,0 | ½,0 |
| 100<(B-Y)<128 | 220<(R-Y)<255 | 1,0 | ½,0 | ½,0 | ½,0 | ½,0 | ½,0 | ½,0 |

TABLE 3

| AVG (B-Y) | AVG (R-Y) | Quantization divider | | | | | | |
|---|---|---|---|---|---|---|---|---|
| | | 1 | 2 | 3 | 4 | 5 | 6 | 7 |
| (B-Y)<80 | don't care | 1,0 | 1,0 | 1,0 | 1,0 | 1,0 | 1,0 | 1,0 |
| don't care | 40<(R-Y)<170 | 1,0 | 1,0 | 1,0 | 1,0 | 1,0 | 1,0 | 1,0 |
| 128<(B-Y)<180 | 0<(R-Y)<40 | 1,1 | 1,1 | 1,½ | 1,½ | 1,0 | 1,0 | 1,0 |
| 80<(B-Y)<100 | 170<(R-Y)<220 | 1,0 | 1,0 | 1,0 | 1,½ | 1,½ | ½,0 | ½,0 |
| 100<(B-Y)<128 | 220<(R-Y)<255 | 1,0 | ½,0 | ½,0 | ½,0 | ½,0 | ½,0 | ½,0 |

In this embodiment of the invention, the signal provided by the quantizer control circuitry 122 is a three-bit signal by which each coefficient in the four luminance blocks and two color difference blocks is divided prior to dividing the various coefficients by values related to their respective frequencies.

When the color detector 210 is programmed as in Table 1, the minimum quantization step size applied to the quantizer 116 is reduced for red or near-red macroblocks. When it is programmed as in Table 2, the quantization step size is decreased in two steps as higher levels of saturation are detected for near-red signals which include some blue. When the color detector 210 is programmed as in Table 3, quantization step size is increased for cyan and near-cyan objects and decreased in two steps for red and near red objects. One of ordinary skill in the art could readily program the color detector 210 to change quantization step size for other color combinations.

Although the invention has been described in terms of an exemplary embodiment, it is contemplated that it may be practiced as outlined above within the spirit and scope of the appended claims.

What is claimed:

1. Apparatus for use in a video signal encoding system which digitally encodes data values representing color image information the system includes quantization apparatus responsive to a control signal for quantizing the color information to be encoded according to a variable step size, the apparatus comprising:

a color detector, responsive to the data values representing color image information, to analyze the color image information and to provide an output signal when the color image information represents colors within a predetermined range of hues and a predetermined range of saturation;

scaling means, responsive to the output signal of the color detector, for changing the control signal to cause the quantization apparatus to selectively change the quantization step size used to encode the color information data values.

2. Apparatus according to claim 1 wherein the video signals are represented as a plurality of blocks of pixels, each block including a plurality of pixel values, and the apparatus further comprising:

averaging means for generating a plurality of values representing the average color of the pixels in the respective plurality of blocks; and means for applying the values generated by the averaging means to the color detector;

wherein, the scaling means is responsive to the output signal of the color detector to cause the quantization apparatus to selectively change the quantization step size for only those color information data values which represent blocks of pixels having average colors within said predetermined range of colors.

3. Apparatus according to claim 2, wherein the encoding system further includes:

a discrete cosine transform processor which generates a plurality of coefficient values representing respectively different spatial frequency components of each of said block of pixel values as the color information data values;

wherein the averaging means extracts, as the average color values, ones of said coefficient values representing spatial frequency components which are lower in frequency than any of the spatial frequency components represented by other coefficient values.

4. Apparatus according to claim 3, wherein the predetermined range of hues includes red.

5. Apparatus according to claim 3, wherein the predetermined range of hues includes hues corresponding to the in-phase (I) chrominance vector as defined by the National Television Standards Committee (NTSC).

6. Video signal encoding apparatus which digitally encodes data values representing color image information, comprising:

means for providing separate luminance and color information signals representing said color image information;

quantization apparatus responsive to a control signal for quantizing the luminance and color information signals according to a variable step size;

signal buffering apparatus which stores, as data values, the quantized luminance and color information signals provided by said quantization apparatus, and provides the stored data values at a fixed rate, and which generates a first buffer fullness signal when the signal buffering apparatus is relatively empty and a second buffer fullness signal when the signal buffering apparatus is relatively full;

quantization control means, responsive to the first and second buffer fullness signals for respectively decreasing and increasing the step size used by the quantization apparatus;

a color detector, responsive to the color information signal applied to the quantization apparatus to analyze the color information signal and to provide an output signal when the color information signal represents image components having colors within a predetermined range of hues and a predetermined range of saturation;

quantization modifying means, coupled to the quantization control means and responsive to the output signal of the color detector, for inhibiting any increase in the quantization step size of the color information signal.

7. Video signal encoding apparatus according to claim 6 wherein the video signals are represented as a plurality of blocks of pixels, each block including a plurality of pixel values, and the apparatus further comprising:

averaging means for generating a plurality of values representing the average color of the pixels in the respective plurality of blocks; and means for applying the values generated by the averaging means to the color detector;

wherein, the quantization modifying means is responsive to the output signal of the color detector to cause the quantization apparatus to selectively change the quantization step size for only those color information data values which represent blocks of pixels having average colors within said predetermined range of colors.

8. Apparatus according to claim 7, wherein the encoding system further includes:

a discrete cosine transform processor which generates a plurality coefficient values representing respectively different spatial frequency components of respectively different color difference signal components of each of said blocks of pixel values as the color information data values;

wherein the averaging means includes means for extracting, as the average color values, ones of said coefficient values representing spatial frequency components which are lower in frequency than any of the spatial frequency components represented by other coefficient values.

9. Apparatus according to claim 8, wherein the predetermined range of hues includes red.

10. Apparatus according to claim 8, wherein the predetermined range of hues includes hues corresponding to the in-phase (I) chrominance vector as defined by the National Television Standards Committee (NTSC).

11. A method of digitally encoding video signals having a luminance component and at least one color information component, said method comprising the steps of:

providing, as respective luminance and color information signals, the luminance and color information components of said video signals;

quantizing the luminance and color information signals according to a variable step size determined by a control signal;

buffering, as data values, the quantized luminance and color information signals, providing the stored data values at a fixed rate, generating a first buffer fullness signal when the signal buffering apparatus is relatively empty and generating a second buffer fullness signal when the signal buffering apparatus is relatively full;

varying the control signal in response to the first and second buffer fullness signals to respectively decrease and increase the step size used by the quantization means;

analyzing the color information signal to provide a color output signal when the color information signal represents image components having hues within a predetermined range of hues and within a predetermined range of saturation;

modifying said control signal to inhibit any increase in the quantization level of the color information signal when the color output signal indicates that the color information signal represents image components having hues within the predetermined range of hues.

* * * * *